US012763643B2

(12) United States Patent
Gao et al.

(10) Patent No.: US 12,763,643 B2
(45) Date of Patent: Oct. 13, 2026

(54) ELECTRICAL MACHINE, AND METHOD FOR COOLING SUCH ELECTRICAL MACHINE

(71) Applicant: VOLVO TRUCK CORPORATION, Gothenburg (SE)

(72) Inventors: Feng Gao, Gothenburg (SE); Ivar Alm, Öckerö (SE); Ronald Susic, Gothenburg (SE); Rasmus Andersson, Hisings Backa (SE); Nikhil Manakshya, Gothenburg (SE); John Lord, Olofstorp (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 226 days.

(21) Appl. No.: 18/417,425

(22) Filed: Jan. 19, 2024

(65) Prior Publication Data

US 2024/0250583 A1 Jul. 25, 2024

(30) Foreign Application Priority Data

Jan. 20, 2023 (EP) ..................................... 23152711

(51) Int. Cl.
*H02K 9/19* (2006.01)
*H02K 5/20* (2006.01)
(Continued)

(52) U.S. Cl.
CPC ............. *H02K 9/193* (2013.01); *H02K 5/203* (2021.01); *H02K 9/227* (2021.01)

(58) Field of Classification Search
CPC .. H02K 1/20; H02K 1/32; H02K 5/18; H02K 5/20; H02K 5/203; H02K 9/12;
(Continued)

(56) References Cited

U.S. PATENT DOCUMENTS

2010/0239441 A1* 9/2010 Bade ..................... F04D 17/122 310/64
2022/0399771 A1 12/2022 Jelinewski et al.
2023/0015125 A1* 1/2023 Tang ......................... H02K 9/20

FOREIGN PATENT DOCUMENTS

CN 106899128 B 8/2019
CN 109038951 B 4/2020
(Continued)

OTHER PUBLICATIONS

DE-102021202838-A1 Machine Translation (Year: 2022).*
(Continued)

*Primary Examiner* — Oluseye Iwarere
*Assistant Examiner* — Masoud Vaziri
(74) *Attorney, Agent, or Firm* — Jeffri A. Kaminski; Venable LLP

(57) ABSTRACT

An electrical machine is provided. The electrical machine comprises a housing enclosing a rotor and a stator, wherein said stator comprises a stator core and end turns extending axially beyond the stator core. The electrical machine further comprises a first cooling system providing a flow of oil to the end turns of the stator, and a second cooling system having an axial end section overlapping the axial position of the end turns of the stator. The axial end section of the second cooling system is provided with one or more cooling fins.

15 Claims, 10 Drawing Sheets

(51) Int. Cl.
*H02K 9/193* (2006.01)
*H02K 9/22* (2006.01)

(58) Field of Classification Search
CPC H02K 9/16; H02K 9/19; H02K 9/193; H02K 9/197; H02K 9/22; H02K 9/227; H02K 2209/00
See application file for complete search history.

(56) References Cited

FOREIGN PATENT DOCUMENTS

| | | | | |
|---|---|---|---|---|
| CN | 211151747 | U | 7/2020 | |
| CN | 211151748 | U | 7/2020 | |
| DE | 102011012454 | A1 | 8/2012 | |
| DE | 102021202838 | A1 * | 9/2022 | ............. B60K 11/02 |
| EP | 3266097 | B1 | 12/2019 | |
| EP | 3716448 | A1 | 9/2020 | |
| EP | 3934065 | A1 | 1/2022 | |
| EP | 4012899 | A1 | 6/2022 | |
| EP | 4063696 | A1 | 9/2022 | |
| EP | 4117152 | A1 | 1/2023 | |
| WO | 202237263 | A1 | 2/2022 | |

OTHER PUBLICATIONS

Extended European Search Report in corresponding European Application No. 23152711.0 dated Jul. 7, 2023 (15 pages).
"Audi E-Tron Twin Motor Water Cooling System"; www.youtube.com; DPCcars; Uploaded Jul. 16, 2020; Accessed Jan. 17, 2024; https://www.youtube.com/watch?v=fqeQEmqoXB8.
Berend Denkena et al; "Cooling of motor spindles-a review"; The International Journal of Advanced Manufacturing Technology; https://doi.org/10.1007/s00170-020-06069-0; published online: Sep. 21, 2020 (22 pages).

* cited by examiner

ELECTRICAL MACHINE, AND METHOD FOR COOLING SUCH ELECTRICAL MACHINE

TECHNICAL FIELD

The disclosure relates generally to electrical machines. In particular aspects, the disclosure relates to electrical machines and cooling of such electrical machines. The disclosure can be applied in heavy-duty vehicles, such as trucks, buses, and construction equipment. Although the disclosure may be described with respect to a particular vehicle, the disclosure is not restricted to any particular vehicle.

BACKGROUND

Electrical machines are normally designed by a fixed stator and a rotor which is supported to rotate relative the stator. The stator has a stator core and end turns projecting axially beyond the stator core. During operation, these end turns will be subject to great heating which needs to be limited in order to allow the electrical machine to operate at the desired performance level. Consequently, various cooling methods have been suggested.

One efficient way of cooling the end turns of the stator is to implement direct oil cooling, which in practice means that the end turns are exposed to a flow of cooling oil. However, it has been realized that the high temperature of the end turns, which could be up to 200° C. during certain conditions, may lead to overheating of the cooling oil. Such overheating may result in deteriorated cooling performance and reduced lifetime of the cooling oil.

In view of this, there is need for improved cooling efficiency in electrical machines.

SUMMARY

According to a first aspect of the disclosure, an electrical machine is provided. The electrical machine comprises a housing enclosing a rotor and a stator, wherein said stator comprises a stator core and end turns extending axially beyond the stator core. The electrical machine further comprises a first cooling system providing a flow of oil to the end turns of the stator, and a second cooling system having an axial end section overlapping the axial position of the end turns of the stator. The axial end section of the second cooling system is provided with one or more cooling fins.

The first aspect of the disclosure may seek to reduce the heat load on the cooling oil used to cool down the end turns of the stator. A technical benefit may include increasing the cooling performance of the electrical machine and increasing the lifetime of the cooling oil.

The end turns of the stator may be arranged in between the first and second cooling system, such that the cooling oil of the first cooling system is allowed to flow across the one or more cooling fins of the second cooling system.

Optionally, the first cooling system comprises at least one oil outlet for guiding a flow of oil to the end turns of the stator. A technical benefit may include efficient means for guiding cooling oil to the end turns of the stator, ensuring correct flowing of the cooling oil to its desired position.

Optionally, the second cooling system comprises a water jacket. A technical benefit may include efficient cooling using a readily available medium.

Optionally, the at least one oil outlet of the first cooling system is arranged radially inwards of the end turns of the stator. A technical benefit may include the cooling oil flowing outwards during operation of the electrical machine, thereby distributing the cooling oil effectively across the end turns of the stator for improving the cooling of these.

Optionally, the second cooling system is arranged radially outwards of the end turns of the stator. A technical benefit may include improved cooling of the oil, since the second cooling system is arranged in the radially outwards flow path of the cooling oil during operation of the electrical machine.

Optionally, the second cooling system forms part of the housing. A technical benefit may include reducing the number of components for the electrical machine.

Optionally, the one or more cooling fins project radially inwards from the housing. A technical benefit may include reducing the flow path for the cooling oil, thereby also reducing the risk for excessive heating of the cooling oil.

Optionally, the at least one oil outlet of the first cooling system is arranged radially outwards of the end turns of the stator. A technical benefit may include improved access to the first cooling system, as it is at least partly arranged radially outside the end turns.

Optionally, the second cooling system is arranged radially inwards of the end turns of the stator. A technical benefit may include increasing the cooling effect of the oil since the oil flow will have an inward direction.

Optionally, the second cooling system forms part of the rotor. A technical benefit may include using the already existing rotor to function as a cooling means thereby reducing the complexity of the electrical machine.

Optionally, the one or more cooling fins project radially outwards from the rotor. A technical benefit may include reducing the flow path for the cooling oil, thereby also reducing the risk for excessive heating of the cooling oil.

Optionally, the one or more cooling fins extend axially, circumferentially, or in any combination thereof. A technical benefit may include the possibility to adjust the function of the cooling fins as they may be axially straight or slightly twisted relative the rotational axis of the electrical machine, or circumferentially ring-shaped or even helically extending.

Optionally, the first cooling system comprises at least one oil outlet for guiding a flow of oil to the end turns of the stator, wherein the second cooling system comprises a water jacket, wherein the one or more cooling fins extend axially, circumferentially, or in any combination thereof. The at least one oil outlet of the first cooling system is arranged radially inwards of said end turns of the stator, the second cooling system is arranged radially outwards of the end turns of the stator, the second cooling system forms part of the housing, and the one or more cooling fins project radially inwards from the housing. Alternately, the at least one oil outlet of the first cooling system is arranged radially outwards of said end turns of the stator, the second cooling system is arranged radially inwards of the end turns of the stator, the second cooling system forms part of the rotor, and the one or more cooling fins project radially outwards from the rotor.

According to a second aspect of the disclosure, a vehicle is provided. The vehicle comprises the electrical machine according to the first aspect. A technical benefit may include increasing performance and usability of the vehicle.

According to a third aspect, a method for cooling an electrical machine is provided. The method comprises operating a first cooling system to provide a flow of cooling oil to end turns of a stator of the electrical machine. The method further comprises operating a second cooling system to cool the cooling oil after interacting with the end turns of the stator, and removing excess heat from the cooling oil by allowing the cooling oil to flow across one or more cooling fins of the second cooling system.

The end turns of the stator may be arranged in between the first and second cooling systems.

For the aspects described above, an electrical machine is provided. The electrical machine comprises a first cooling system and a second cooling system. The first cooling system is configured to provide a flow of oil to end turns of the stator. The second cooling system comprises cooling fins arranged to axially overlap the positions of the end turns.

The first and second cooling systems may be arranged on radially opposite sides of the end turns of the stator. The first cooling system may provide an oil flow such that oil is directed radially inwards onto the end turns of the stator. In such case the cooling fins are arranged radially inwards of the end turns. The first cooling system may in another example, provide an oil flow such that oil is directed radially outwards onto the end turns of the stator. In such case the cooling fins are arranged radially outwards of the end turns.

The first and second cooling systems may be fluid cooling systems. The first cooling system may be configured to provide an oil flow, while the second cooling system may be a water cooling system.

The one or more cooling fins may have an axial extension. The one or more cooling fins may protrude towards the end turns of the stator. The one or more cooling fins may have one end which is attached to a machine structure such as a housing or a rotor, and one opposite end which is facing the end turns of the stator.

The disclosed aspects, examples (including any preferred examples), and/or accompanying claims may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

Figure 1:
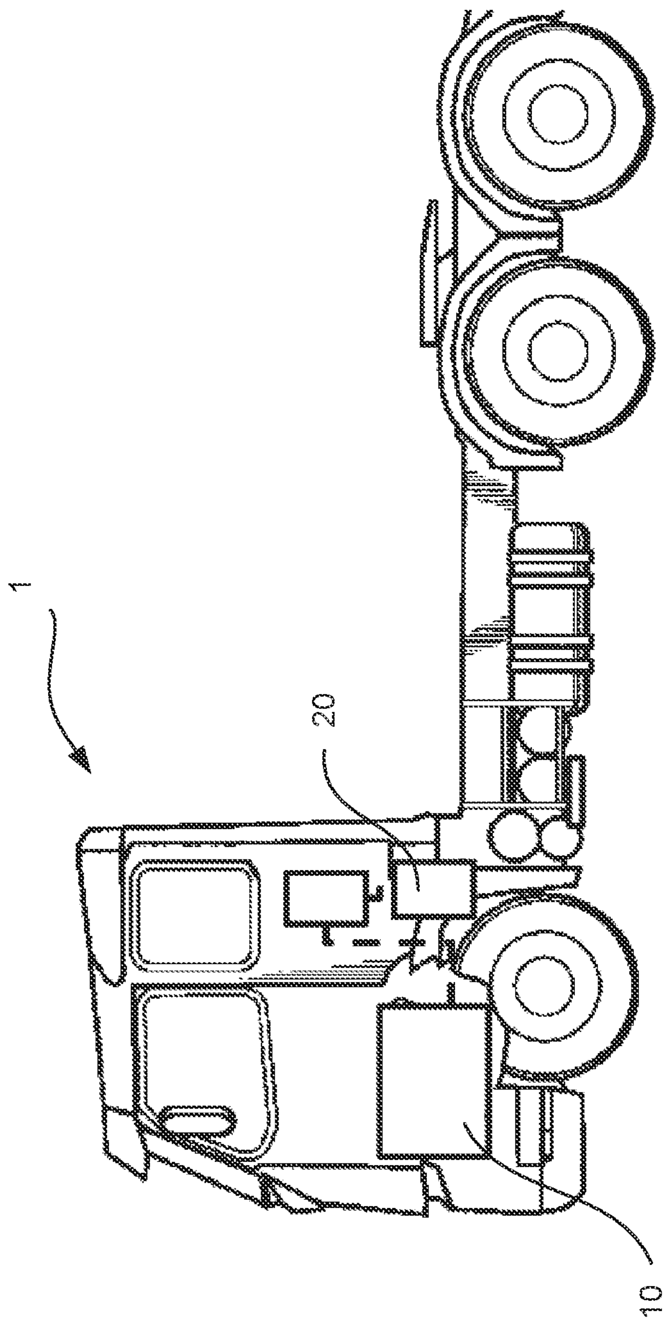
FIG. 1 is an exemplary view of a vehicle according to one example.

With reference to FIG. 1, a vehicle 1, here embodied as a heavy duty truck 1, is disclosed for which an electrical machine 10 and a method 100 (see FIG. 5) for cooling such electrical machine 10 are advantageous. However, the electrical machine 10 and/or the method 100 may as well be implemented in other types of applications, in particular in other types of vehicles such as a busses, light-weight trucks, passenger cars, marine applications, etc.

The vehicle 1 is preferably an electric vehicle, such as a full electric vehicle or a hybrid vehicle, comprising at least one electrical machine 10, an energy storage system 20 comprising energy storage or energy transformation devices, typically batteries or fuel cells. The energy storage system 20 is arranged and configured to power the electrical machine 10.

The vehicle 1 typically further comprises other parts of a powertrain such as a transmission, drive shafts, and wheels (not shown in details in FIG. 1).

Figure 2A:
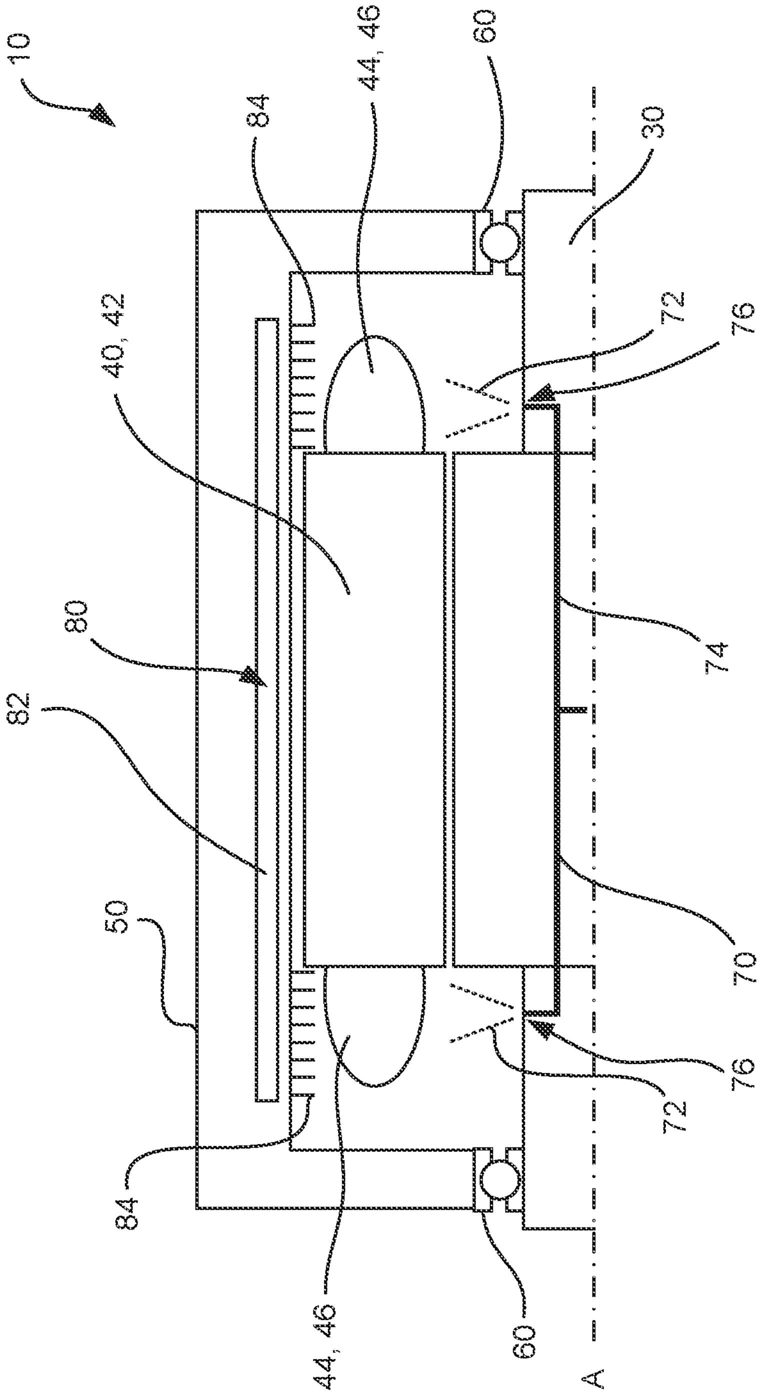
FIG. 2A is an exemplary view of an electrical machine according to an example.

Now turning to FIG. 2A, an example of an electrical machine 10 is shown in cross-section. Due to the rotational symmetry of the electrical machine 10, only one half of the electrical machine 10 is shown. The electrical machine 10 is configured to, when activated, rotate around rotational axis A.

The electrical machine 10 comprises a rotor 30 and a stator 40. The electrical machine 10 further comprises a fixed housing 50 enclosing the rotor 30 and the stator 40. As can be seen in FIG. 2A the rotor 30 is arranged at an inner radius and the stator 40 surrounds the rotor 30.

The rotor 30 is rotationally supported by the housing 50 using one or more bearings 60. It should be understood that other alternatives for supporting the rotor 30 could be considered.

The stator 40 is formed by a stator core 42 supporting a plurality of windings 44. Each axial end of the windings 44 forms end turns 46, which project axially beyond the stator core 42.

In order to cool down the end turns 46 of the stator 40 a first cooling system 70 is provided. The first cooling system 70 is configured to direct a flow of cooling oil 72 towards the end turns 46. In the shown example, the first cooling system 70 is arranged as part of the rotor 30.

The first cooling system 70 comprises an oil conduit 74 arranged inside or at the rotor 30. The oil conduit 74 terminates in one or more oil outlets 76 which are arranged at an axial position corresponding to the axial position of the end turns 46 of the stator 40. Hence, as oil 72 exits the first cooling system 70 through the one or more oil outlets 76 the oil will flow to the end turns 46 of the stator 40, thereby cooling down the end turns 46.

Preferably, the first cooling system 70 comprises a plurality of oil outlets 76 distributed along the circumference on opposite sides of the rotor 30 such that end turns 46 on each side of the stator core 42 will be subject to the flow of cooling oil 72. On each side of the rotor 30 the plurality of oil outlets 76 may e.g. be arranged at the same axial position, such that the oil outlets 76 form a ring of outlets on each side of the rotor 30.

As explained above the cooling oil 72 may be significantly heated by the end turns 46 of the stator 40 and for that reason it is desired to lower the temperature of the cooling oil 72. For this purpose the electrical machine 10 comprises a second cooling system 80. In this example the second cooling system 80 is formed by a water jacket 82 arranged at the housing 50 and extending, in an axial direction, at least to overlap the axial positions of the end turns 46 of the stator 40. By cooling down the housing 50, the second cooling system will assist in reducing the temperature of the end turns 46 of the stator 40.

The second cooling system further comprising one or more cooling fins 84. The cooling fins 84 are preferably arranged on opposite axial sides, such that one set of cooling fins 84 axially overlaps the end turns 46 on one side of the stator core 42, while another set of cooling fins 84 axially overlaps the end turns 46 on the opposite side of the stator core 42. In the shown example, the cooling fins 84 are provided as concentric fins attached to the housing 50 and extending radially inwards towards the end turns 46.

As the rotor 30 rotates the oil 72 will be ejected from the oil outlets 76 and hit the end turns 46 of the stator 40 to cool these. The cooling oil 72 will then splash onto the cooling fins 84 of the second cooling system 80 whereby the temperature of the cooling oil 72 will be effectively reduced.

Figure 2B:
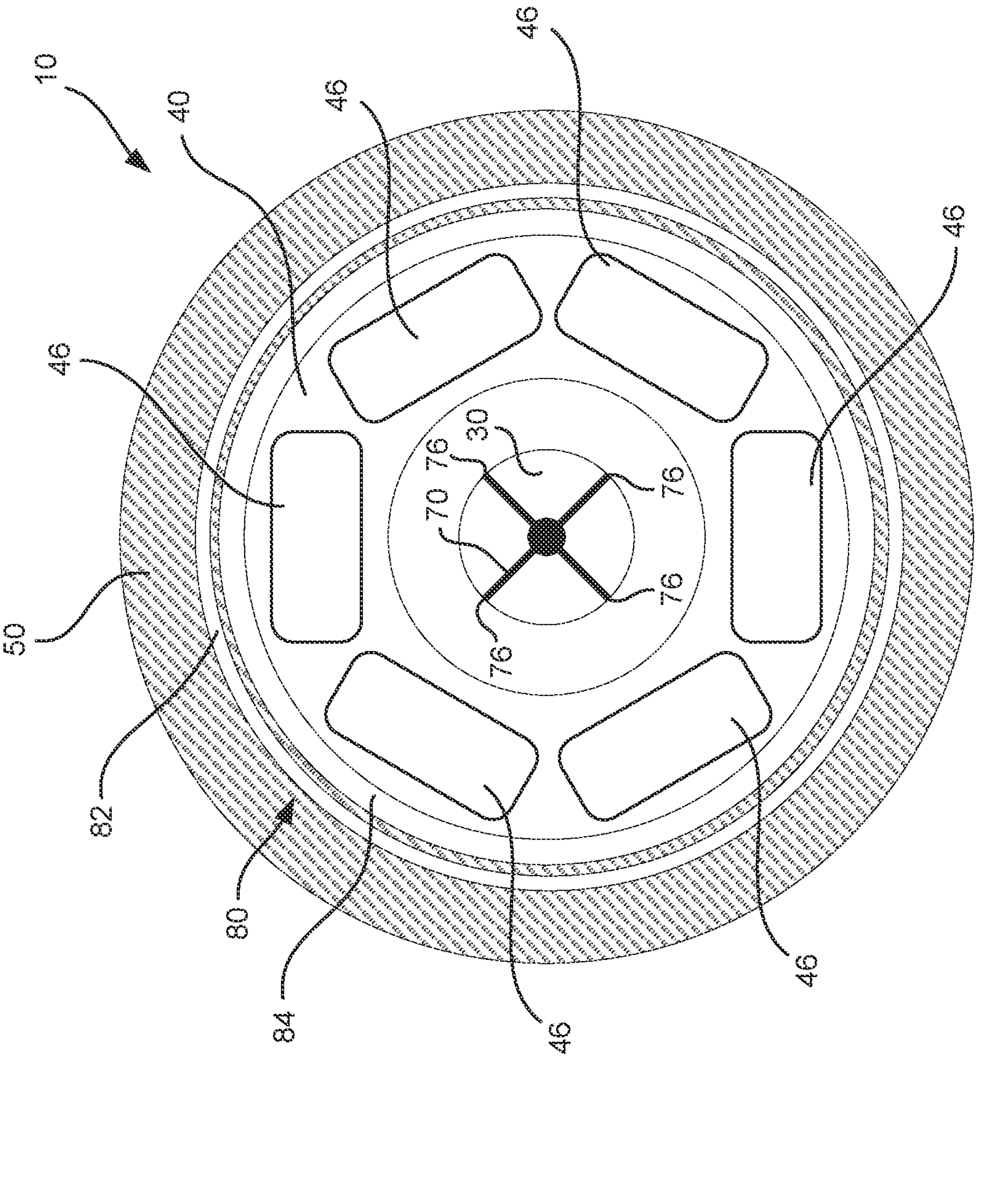
FIG. 2B is a cross-sectional view of an electrical machine shown in FIG. 2A.

The example shown in FIG. 2A is further shown in cross-section in FIG. 2B. In this example the stator 40 comprises six poles, each represented by a respective end turn 46. It should however be realized that the stator 40 may be designed with any number of suitable poles, as is well known in the art.

Further, in the shown example the first cooling system 70 comprises four oil outlets 76 evenly distributed along the circumference of the rotor 30. It should however be realized that the number of oil outlets 76 could be different, ranging from 1 and upwards.

The water jacket 82 of the second cooling system 80 is shown to extend around the entire stator 40. Other alternatives are possible, e.g. the water jacket 82 may be split into several sections extending axially and/or circumferentially or in any other possible way to provide the desired cooling effect.

The circumferential ring-shaped cooling fins 84 are arranged at a certain distance from the end turns 46 of the stator 40. Preferably the distance should be kept small in order to reduce the overall size of the electrical machine 10, however the distance should preferably be large enough to avoid electrical breakdown between the end turns 46 and the stator housing 50. Optionally, the cooling fins 84 may not extend around the entire circumference of the stator 40 but each cooling fin 84 could in some examples by divided into several segments. Preferably, each cooling fins segment is circumferentially aligned with a correspond pole of the stator 40.

Figure 2C:
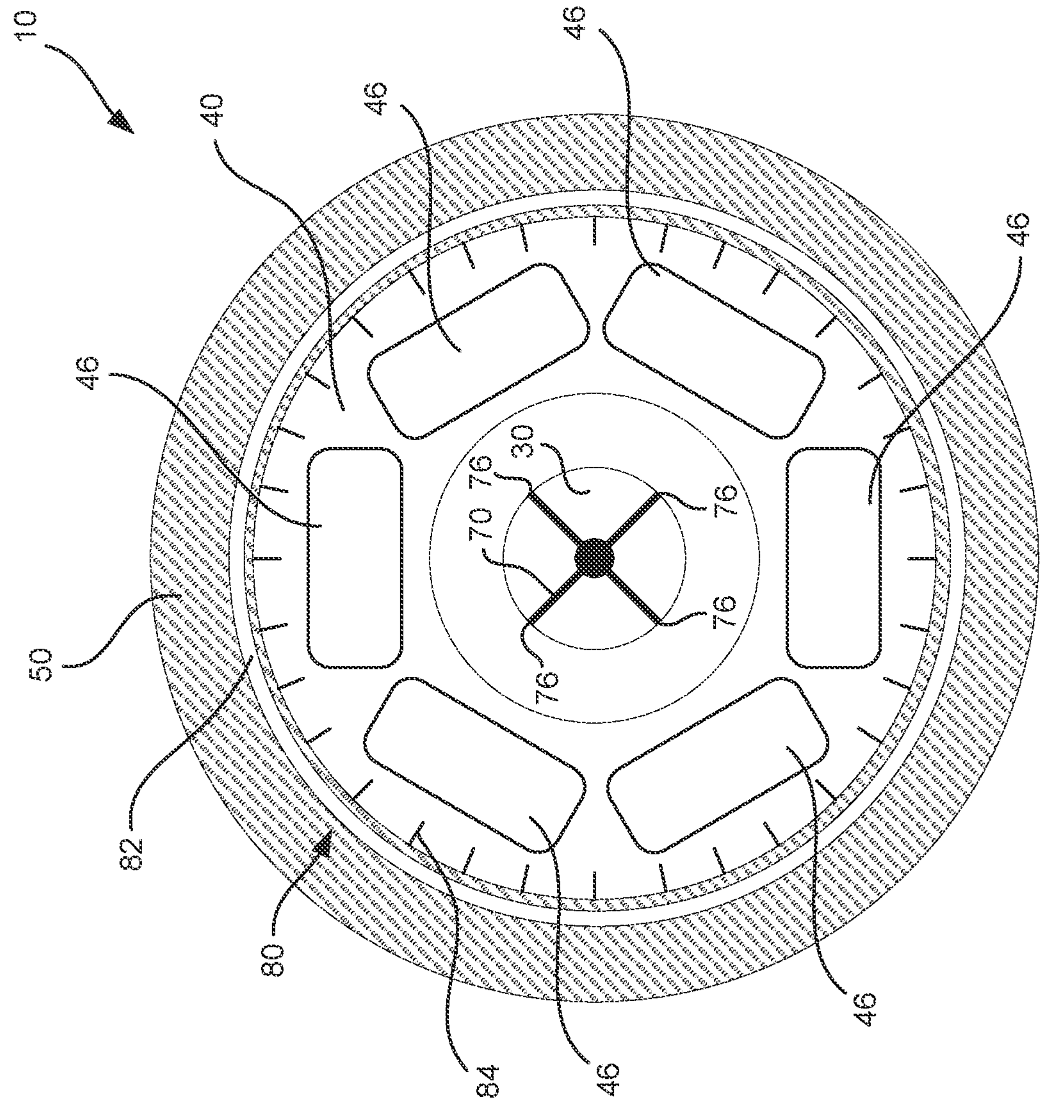
FIG. 2C is a cross-sectional view of an electrical machine according to an example.

In FIG. 2C another example of an electrical machine 10 is shown. The electrical machine 10 is identical to the electrical machine 10 shown in FIG. 2B except for the cooling fins 84. As shown in FIG. 2C the cooling fins 84 are not ring shaped, but instead the cooling fins 84 are provided as axially extending plates distributed along the inner circumference of the housing 50. The exact configuration and number of cooling fins 84 may vary depending on the specific application, number of stator poles, etc. For example, the axial length of each cooling fin 84 may be matched with the axial length of the end turns 46. In other examples the axial length of each cooling fin 84 is larger or smaller than the axial length of the end turns 46.

Figure 2D:
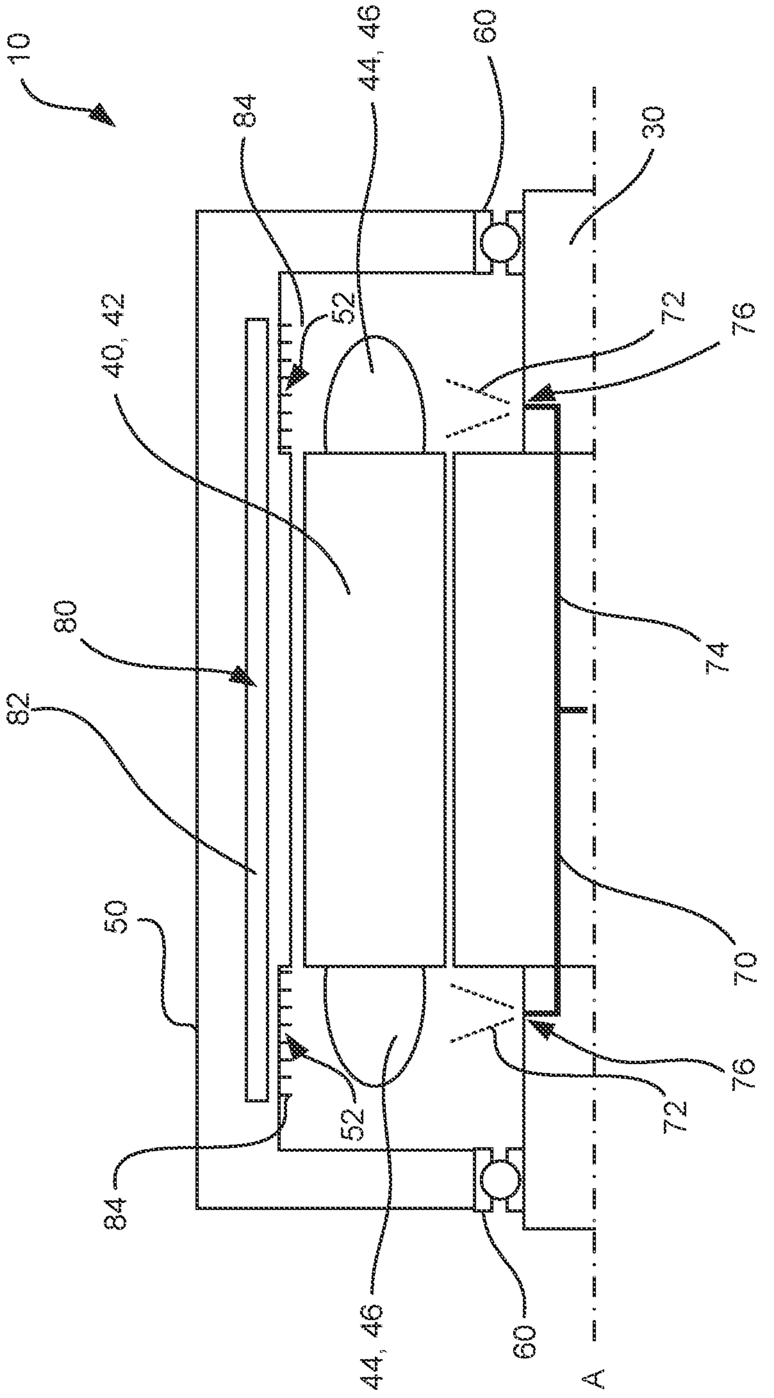
FIG. 2D is an exemplary view of an electrical machine according to an example.

In FIG. 2D another example of an electrical machine 10 is shown. The electrical machine 10 is similar to the electrical machine shown in FIG. 2A, except for the position of the cooling fins 84. In order to ensure a sufficient clearance distance between housing 50 and the end turns 46, and thereby avoiding arcing or electrical breakdown, the housing 50 is provided with a circumferential recess 52 at the axial position of each end turn 46. The recess 52 is formed radially outwards, such that the distance between the housing 50 and the end turns 46 is increased at the recesses 52. The cooling fins 84 are arranged at the recesses 52, such that a sufficient radial distance between the cooling fins 84 and the end turns 46 is ensured. Preferably, in this example the depth of the recess 52 is substantially equal to the height of the cooling fins 84.

Both referring to FIGS. 2A and 2D, the design of the cooling fins 84 can be varied according to specific requirements. The height of the cooling fins 84 may be made relatively large or relatively small, depending on the needed clearance between the end turns 46 and the housing 50.

Figure 3A:
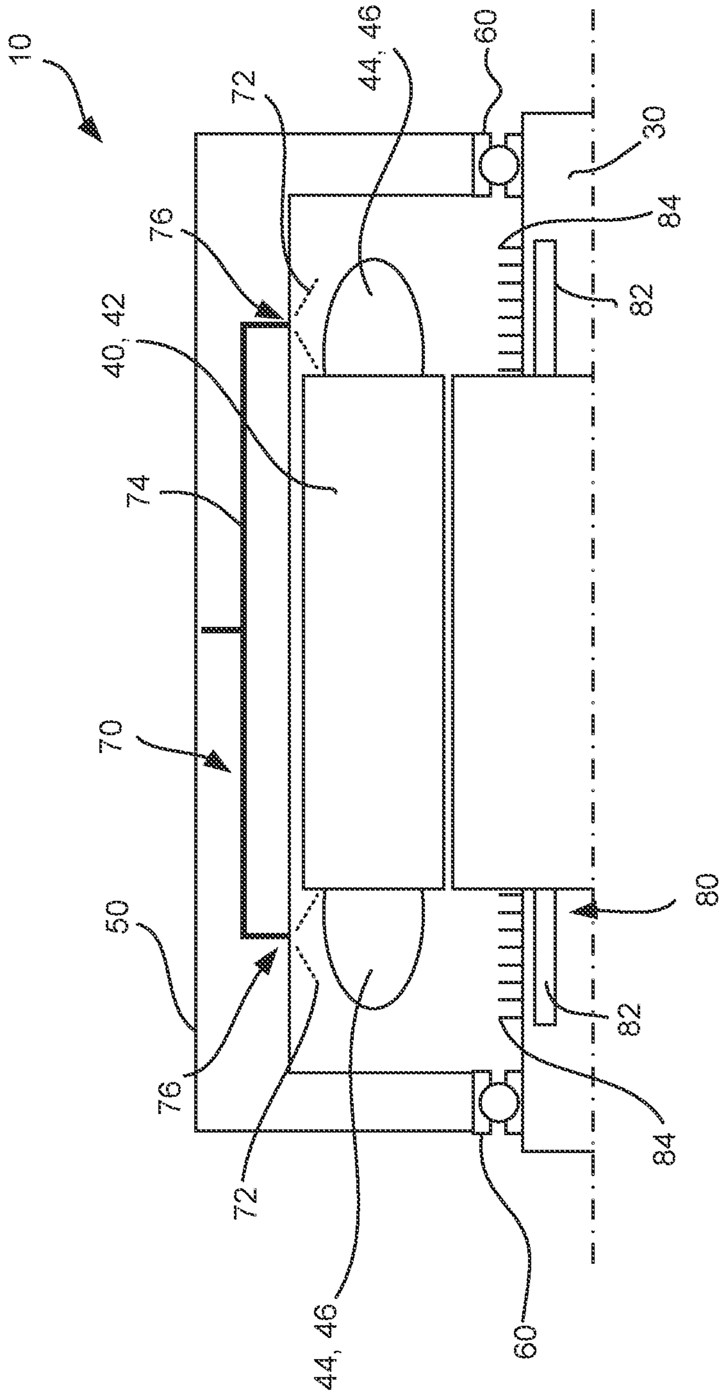
FIG. 3A is an exemplary view of an electrical machine according to a an example.
Figure 3B:
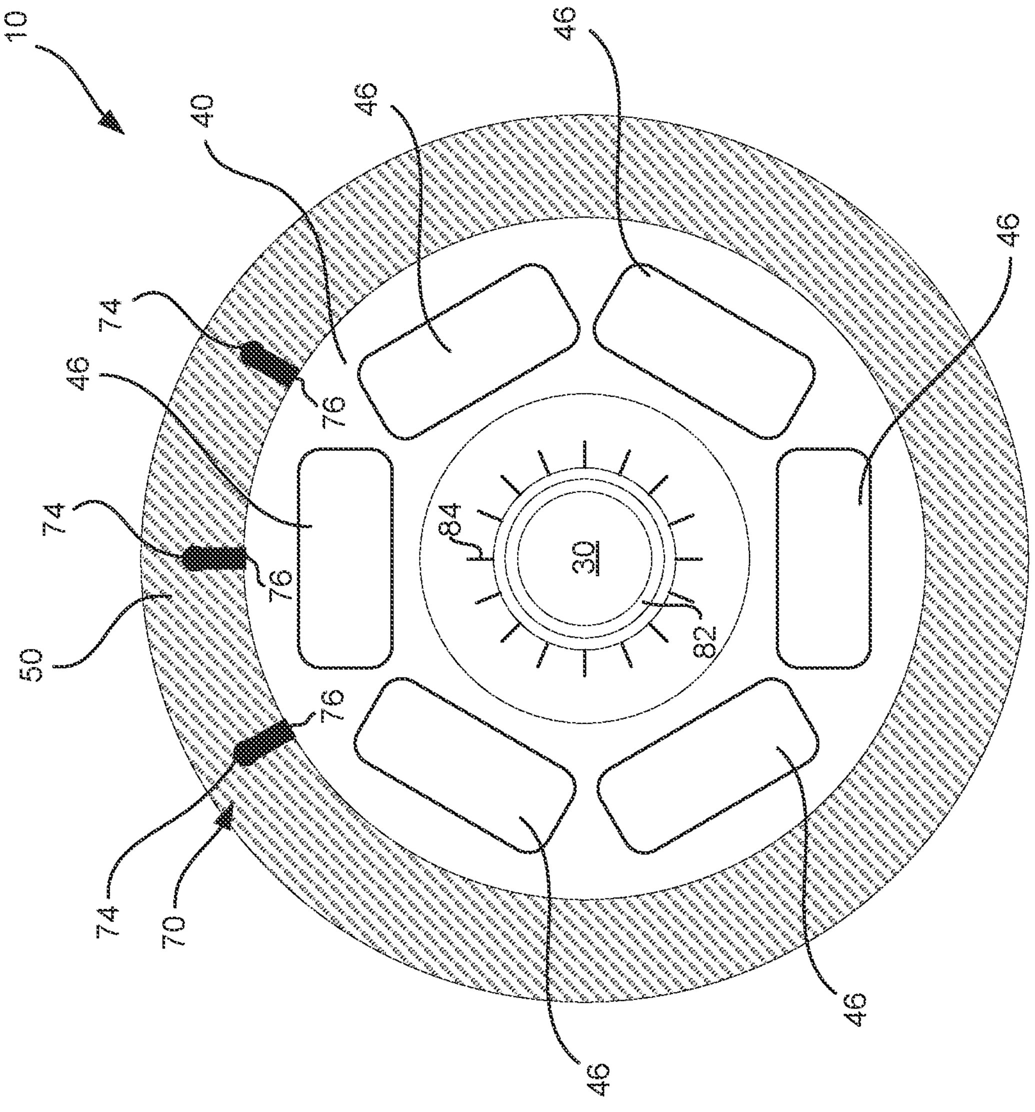
FIG. 3B is a cross-sectional view of an electrical machine according to an example.

Another example of an electrical machine 10 is shown in FIGS. 3A and 3B. The electrical machine 10 is similar to the electrical machine 10 shown in FIG. 2A, but the respective position of the first and second cooling system 70, 80 has been changed.

The first cooling system 70, configured to direct a flow of cooling oil 72 to the end turns 46 of the stator 40, is here forming part of the housing 50 such that the cooling oil 72 flows from a radially outside position and inwards to hit the end turns 46 of the stator 40. The number of oil outlets 76 may as previously been explained, vary and their axial position is preferably aligned with the axial positions of the end turns 46.

As shown in FIG. 3B the number of oil outlets 76 is three, arranged at the upper part of the housing 50. However the exact number of oil outlets 76 may be more or less, depending on specific requirements and design considerations.

The second cooling system 80, including the water jacket 82 and the plurality of cooling fins 84, is forming part of the rotor 30 such that the end turns 46 of the stator 40 are arranged in between the first and second cooling systems 70, 80. The water jacket 82 extends at least partly along the axial extension of the rotor 30, in the shown example the water jacket 82 axially overlaps the cooling fins 84.

As is shown in FIG. 3A the cooling fins 84 are arranged as concentric cooling fins 84 protruding radially out from the rotor 30. In FIG. 3B the cooling fins 84 are not ring shaped, but instead the cooling fins 84 are provided as axially extending plates distributed along the outer circumference of the rotor 30. The exact configuration and number of cooling fins 84 may vary depending on the specific application, number of stator poles, rotor size, etc. For example, the axial length of each cooling fin 84 may be matched with the axial length of the end turns 46. In other examples the axial length of each cooling fin 84 is larger or smaller than the axial length of the end turns 46.

As the electrical machine 10 is running the first cooling system 70 will cause cooling oil 72 to hit the end turns 46, which consequently will result in exchange of thermal energy between the end turns 46 and the cooling oil 72. As the cooling oil 72 flows further inwards towards the rotor 30, the cooling oil 72 will hit the cooling fins 84 thereby effectively cooling down the oil 72.

Figure 4A:
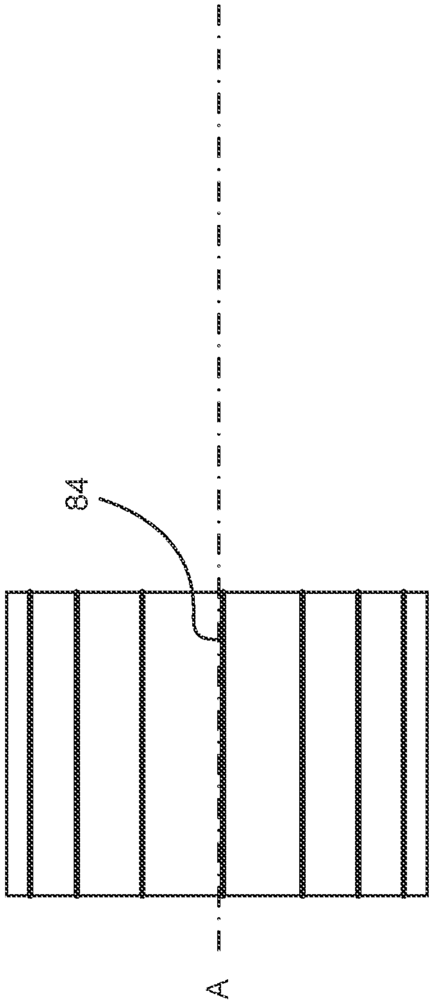
FIGS. 4A-D are exemplary views of parts of an electrical machine according to various examples.
Figure 4B:
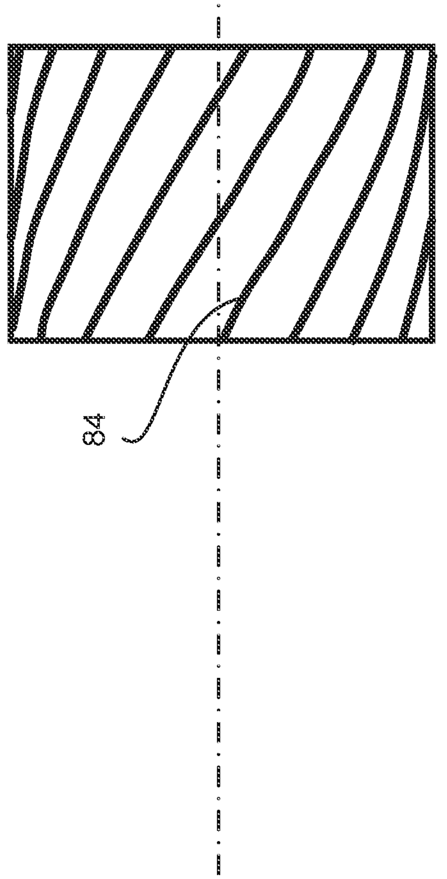

In FIGS. 4A-4D different examples of the cooling fins 84 are shown. In FIG. 4A the cooling fins 84 extend axially, such as described with reference to FIG. 2C. In another example, the cooling fins 84 of the second cooling system 80 extend axially but slightly twisted in relation to the rotational axis A. Such example is shown in FIG. 4B.

Figure 4C:
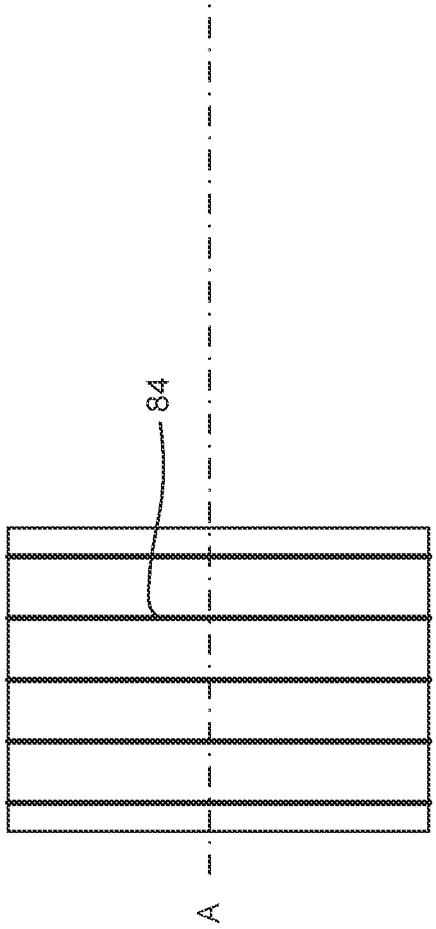
Figure 4D:
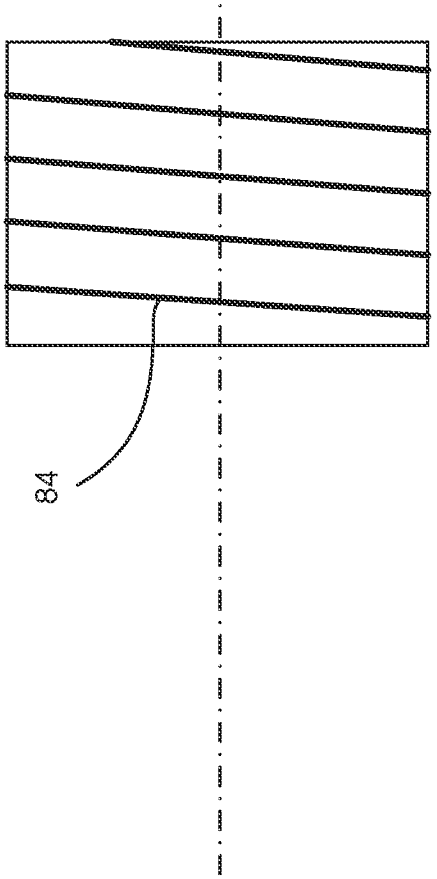

In FIG. 4C the cooling fins 84 extend circumferentially, such as described with reference to FIG. 2A, FIG. 2B, and FIG. 3. In a further example, the cooling fins 84 of the second cooling system 80 extend circumferentially but slightly twisted in relation to the rotational axis A. Such example is shown in FIG. 4D.

Figure 5:
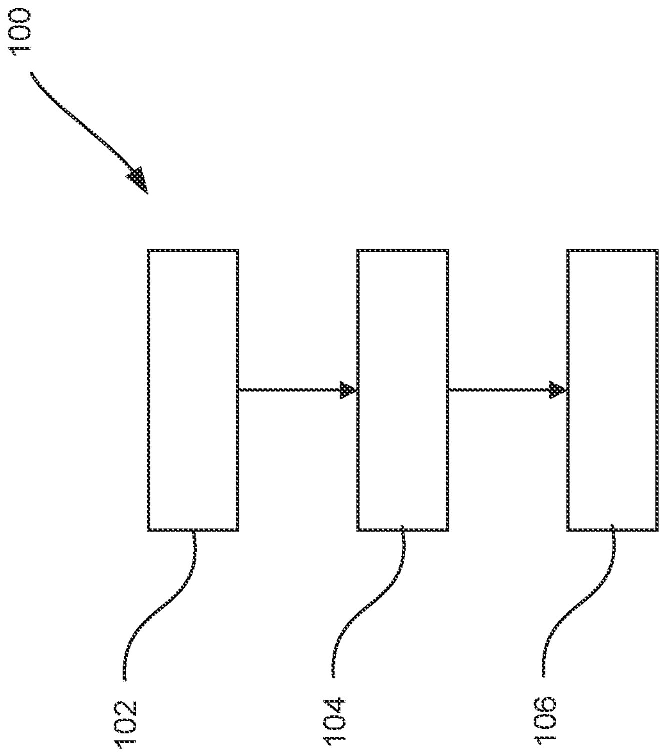
FIG. 5 is a schematic view of a method according to an example.

Now turning to FIG. 5 a method 100 for an electrical machine 10 is schematically shown. The method 100 comprises operating 102 a first cooling system 70 to provide a flow of cooling oil 72 to end turns 46 of a stator 40 of the electrical machine 10. The method 100 further comprises operating 104 a second cooling system 80 to cool the cooling oil 72 after interacting with the end turns 46 of the stator 40, and removing 106 excess heat from the cooling oil 72 by allowing the cooling oil 72 to flow across one or more cooling fins 84 of the second cooling system 80.

Figure 6:
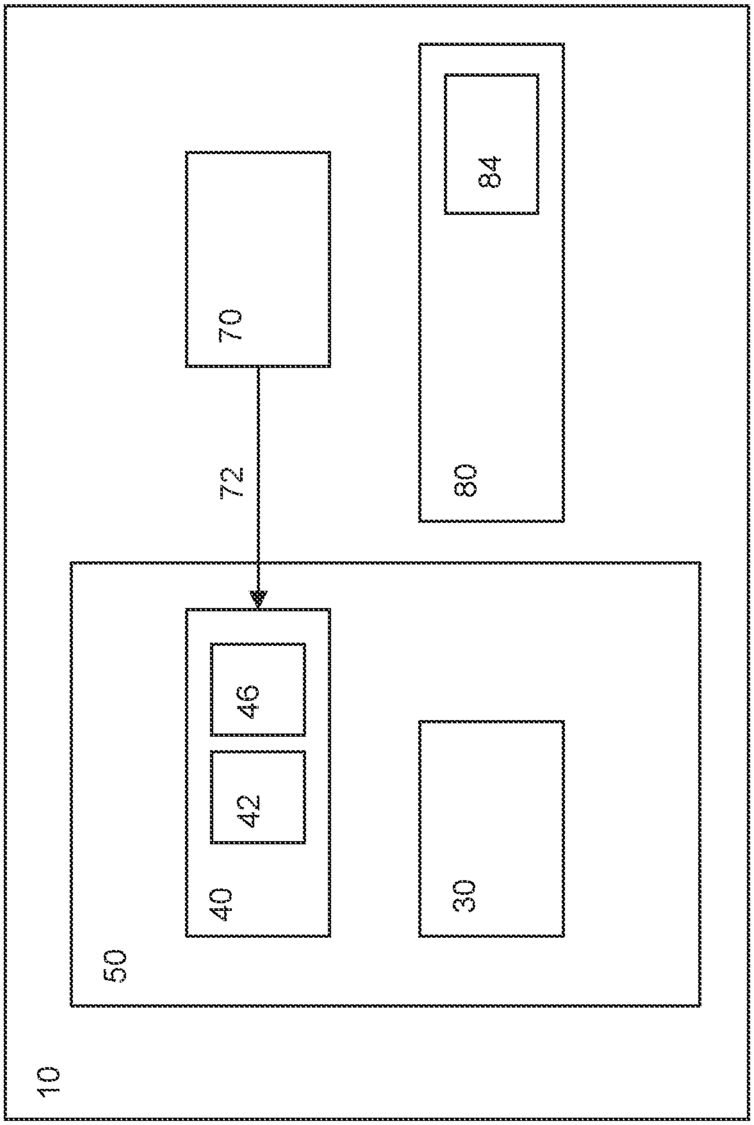
FIG. 6 is another view of an electrical machine, according to another example.

FIG. 6 is another view of an electrical machine 10, according to another example. The electrical machine 10 comprises a housing 50 enclosing a rotor 30 and a stator 40, wherein said stator 40 comprises a stator core 42 and end turns 46 extending axially beyond the stator core 42. The electrical machine 10 further comprises a first cooling system 70 providing a flow of oil 72 to the end turns 46 of the stator 40, and a second cooling system 80 having an axial end section overlapping the axial position of the end turns 46 of the stator 40. The axial end section of the second cooling system 80 is provided with one or more cooling fins 84.

Example 1: An electrical machine, comprising a housing 50 enclosing a rotor 30 and a stator 40, wherein said stator 40 comprises a stator core 42 and end turns 46 extending axially beyond the stator core 42, wherein the electrical machine 10 further comprises: a first cooling system 70 providing a flow of oil 72 to the end turns 46 of the stator 40, and a second cooling system 80 having an axial end section overlapping the axial position of the end turns 46 of the stator 40, wherein the axial end section of the second cooling system 80 is provided with one or more cooling fins 84.

Example 2: The electrical machine of Example 1, wherein the first cooling system 70 comprises at least one oil outlet 76 for guiding a flow of oil 72 to the end turns 46 of the stator 40.

Example 3: The electrical machine of any of Examples 1-2, wherein the second cooling system 80 comprises a water jacket 82.

Example 4: The electrical machine of any of Examples 2-3, wherein the at least one oil outlet 76 of the first cooling system 70 is arranged radially inwards of said end turns 46 of the stator 40.

Example 5: The electrical machine of Example 4, wherein the second cooling system 80 is arranged radially outwards of the end turns 46 of the stator 40.

Example 6: The electrical machine of Example 4 or 5, wherein the second cooling system 80 forms part of the housing 50.

Example 7: The electrical machine of any of Examples 4-6, wherein the one or more cooling fins 84 project radially inwards from the housing 50.

Example 8: The electrical machine of any of Examples 2-3, wherein the at least one oil outlet 76 of the first cooling system 70 is arranged radially outwards of said end turns 46 of the stator 40.

Example 9: The electrical machine of Example 8, wherein the second cooling system 80 is arranged radially inwards of the end turns 46 of the stator 40.

Example 10: The electrical machine of Example 8 or 9, wherein the second cooling system 80 forms part of the rotor 30.

Example 11: The electrical machine of any of Examples 8-10, wherein the one or more cooling fins 80 project radially outwards from the rotor 30.

Example 12: The electrical machine of any of Example 1-11, wherein the one or more cooling fins 84 extend axially.

Example 13: The electrical machine of any of Example 1-11, wherein the one or more cooling fins 84 extend circumferentially.

Example 14: The electrical machine of any of Example 1-11, wherein the one or more cooling fins 84 extend axially and circumferentially.

Example 15: The electrical machine of Example 1, wherein the first cooling system 70 comprises at least one oil outlet 76 for guiding a flow of oil 72 to the end turns 46 of the stator 40, wherein the second cooling system 80 comprises a water jacket 82, wherein the one or more cooling fins 84 extend axially, circumferentially, or in any combination thereof, and wherein the at least one oil outlet 76 of the first cooling system 70 is arranged radially inwards of said end turns 46 of the stator 40, the second cooling system 80 is arranged radially outwards of the end turns 46 of the stator 40, the second cooling system 80 forms part of the housing 50, and the one or more cooling fins 84 project radially inwards from the housing 50, or wherein the at least one oil outlet 76 of the first cooling system 70 is arranged radially outwards of said end turns 46 of the stator 40, the second cooling system 80 is arranged radially inwards of the end turns 46 of the stator 40, the second cooling system 80 forms part of the rotor 30, and the one or more cooling fins 84 project radially outwards from the rotor 30.

Example 16: A vehicle comprising the electrical machine 10 according to any of Example 1-15.

Example 17: A method 100 for cooling an electrical machine, comprising: operating a first cooling system to provide a flow of cooling oil to end turns of a stator of the electrical machine, operating a second cooling system to cool the cooling oil after interacting with the end turns of the stator, and removing excess heat from the cooling oil by allowing the cooling oil to flow across one or more cooling fins of the second cooling system.

Example 18: The method according to Example 17, wherein the flow of oil from the first cooling system is a radial flow.

Example 19: The method according to Example 17 or 18, wherein the first cooling system provides a flow of cooling oil directed radially inwards.

Example 20: The method according to Example 17 or 18, wherein the first cooling system provides a flow of cooling oil directed radially outwards.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. An electrical machine, comprising a housing enclosing a rotor and a stator, wherein said stator comprises a stator core and end turns extending axially beyond the stator core, wherein the electrical machine further comprises:

a first cooling system providing a flow of oil to the end turns of the stator, and a second cooling system having an axial end section overlapping the axial position of the end turns of the stator, wherein the axial end section of the second cooling system is provided with one or more cooling fins, and the second cooling system is configured to remove excess heat from the cooling oil by allowing the cooling oil to flow across one or more cooling fins of the second cooling system.

2. The electrical machine of claim 1, wherein the first cooling system comprises at least one oil outlet for guiding a flow of oil to the end turns of the stator.

3. The electrical machine of claim 1, wherein the second cooling system comprises a water jacket.

4. The electrical machine of claim 2, wherein the at least one oil outlet of the first cooling system is arranged radially inwards of said end turns of the stator.

5. The electrical machine of claim 4, wherein the second cooling system is arranged radially outwards of the end turns of the stator.

6. The electrical machine of claim 4, wherein the second cooling system forms part of the housing.

7. The electrical machine of claim 4, wherein the one or more cooling fins project radially inwards from the housing.

8. The electrical machine of claim 2, wherein the at least one oil outlet of the first cooling system is arranged radially outwards of said end turns of the stator.

9. The electrical machine of claim 8, wherein the second cooling system is arranged radially inwards of the end turns of the stator.

10. The electrical machine of claim 8, wherein the second cooling system forms part of the rotor.

11. The electrical machine of claim 8, wherein the one or more cooling fins project radially outwards from the rotor.

12. The electrical machine of claim 1, wherein the one or more cooling fins extend axially, circumferentially, or in any combination thereof.

13. The electrical machine of claim 1, wherein the first cooling system comprises at least one oil outlet for guiding a flow of oil to the end turns of the stator, wherein the second cooling system comprises a water jacket, wherein the one or more cooling fins extend axially, circumferentially, or in any combination thereof, and wherein either the at least one oil outlet of the first cooling system is arranged radially inwards of said end turns of the stator, the second cooling system is arranged radially outwards of the end turns of the stator, the second cooling system forms part of the housing, and the one or more cooling fins project radially inwards from the housing, or the at least one oil outlet of the first cooling system is arranged radially outwards of said end turns of the stator, the second cooling system is arranged radially inwards of the end turns of the stator, the second cooling system forms part of the rotor, and the one or more cooling fins project radially outwards from the rotor.

14. A vehicle comprising the electrical machine according to claim 1.

15. A method for cooling an electrical machine, comprising:

operating a first cooling system to provide a flow of cooling oil to end turns of a stator of the electrical machine, operating a second cooling system to cool the cooling oil after interacting with the end turns of the stator, and removing excess heat from the cooling oil by allowing the cooling oil to flow across one or more cooling fins of the second cooling system.

* * * * *